Figure 1:
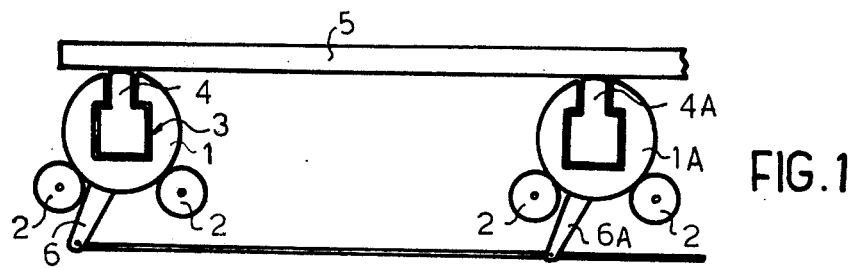

United States Patent [19]

Brusa

[11] 4,151,908
[45] May 1, 1979

[54] DEVICE FOR DISPLACING ELONGATED BODIES TRANSVERSELY TO THEIR AXES

[76] Inventor: Ugo Brusa, Via Vagna, Domodossola, Italy

[21] Appl. No.: 856,429

[22] Filed: Dec. 1, 1977

[30] Foreign Application Priority Data

Dec. 7, 1976 [IT] Italy ............... 69917 A/76

[51] Int. Cl.² .............................. B65G 25/04
[52] U.S. Cl. ................. 198/775; 198/485;
198/750; 198/786; 414/745; 414/749
[58] Field of Search ............ 214/1 P, 1 BB; 198/365,
198/485, 750, 774, 775, 786

[56] References Cited
U.S. PATENT DOCUMENTS

| | | | |
|---|---|---|---|
| 3,455,433 | 7/1969 | Gentry | 198/774 X |
| 3,891,081 | 6/1975 | Schirmag | 214/1 P X |
| 4,042,118 | 8/1977 | Schmidt | 214/1 P X |
| 4,069,009 | 1/1978 | Yamawaki et al. | 198/774 X |

Primary Examiner—L. J. Paperner

[57] ABSTRACT

A device for displacing elongated bodies transversely to their axes comprises at least two parallel and horizontal supporting bars of circular cross section, lying in the same plane and having each a longitudinal, outwardly open groove which houses a slide of which the cross section corresponds to that of the groove and has a part inscribed in the circumference of the bar section. Means are provided for slightly rotating the bars about their axes for longitudinally displacing the slides within the grooves. The elongated body to be displaced is placed on the bars so as to rest on the slides which are then moved to displace the body; afterwards, the bars are rotated so that the body is no longer in contact with the slides, which can be moved back to the initial position.

6 Claims, 3 Drawing Figures

U.S. Patent May 1, 1979 4,151,908

DEVICE FOR DISPLACING ELONGATED BODIES TRANSVERSELY TO THEIR AXES

The present invention relates to a device for displacing elongated bodies, such as bars, rails, profiled or laminated or extruded bodies, billets and the like, transversely to their axis.

In many technical fields it may be necessary to displace a number of bodies of substantially prismatic or cylindric shape, with substantially rectilinear axes.

Whereas a displacement in the axial direction is quite easy to be obtained, by placing the body to be conveyed on idle or driven rollers, the known technique for the displacement uses complex devices, of delicate operation and large power consumption.

Generally said devices are fork shaped devices which take the bodies to be displaced at the underside, lift and laterally displace them, and then place said bodies on another support which generally is located at height little different from that of the initial support. Therefore a raising effort is carried out that would not be necessary but is required by the structure of the device. The power consumption is completely out of proportion to the achieved result.

It is then to be appreciated that, if the bodies to be conveyed are relatively long, a plurality of fork devices is required, so that synchronization problems arise in order to prevent the conveyed bodies from falling down, which would be dangerous both for the persons and for the installations.

In case of iron bodies magnetic elevators are sometimes employed; yet they have the same or similar drawbacks.

The object of the present invention is to provide a device which allows to transverse displacement of elongated bodies, without the need to raise them from the position in which they are placed on a suitable support, and by employing simple and robust means, of relatively low cost, long life and easy maintenance.

The device comprises at least two suporting bars, of circular cross-section, the axes of which are horizontal, parallel to one another and at the same height, said bars being mounted on means facilitating their rotation about their axes, and having each a longitudinal groove, preferably of prismatic cross-section and opening outwardly, that is on the cylindrical bar surface, said groove having a slide having a cross-section corresponding with that of the groove and a portion inscribed within the circumference forming the bar section; means being provided for slightly rotating about the axis thereof the bar and the slide contained therein, in either direction, and for longitudinally moving said slide relative to said bar.

Preferably the means facilitating the rotation of each bar about its axis comprises bearing rollers, and the means driving the rotation of each bar comprises radial appendages solid with the bar and subjected to the action of a jack. Advantageously both bars (or all bars, in case there are more than two) are connected to one another so that their rotations are simultaneous. Similarly, the slides are connected so as to slide simultaneously.

Advantageously means are provided within the groove for facilitating the slide displacement; for instance this slide may be provided with wheels.

Figure 2:
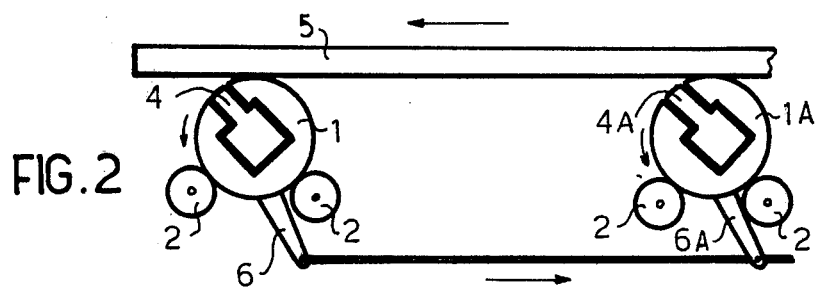
Figure 3:
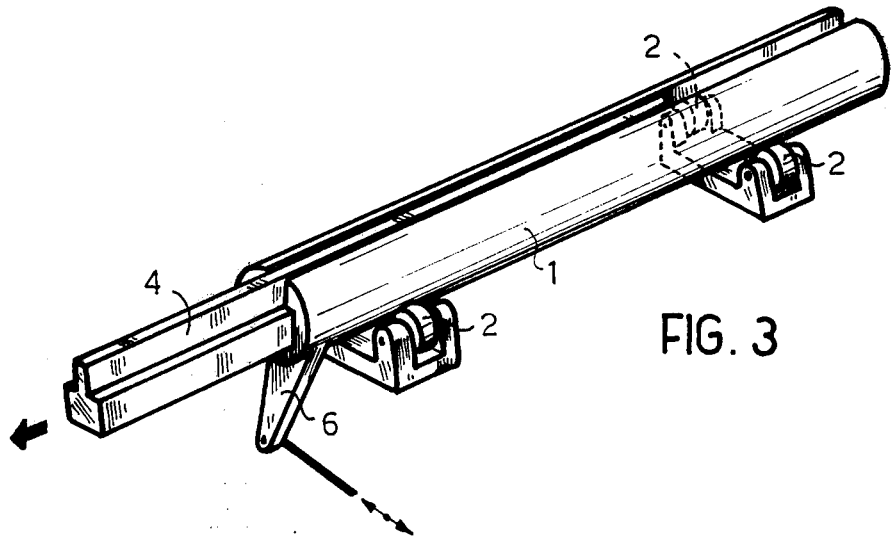

For a better clearness reference is made to the accompanying drawing, in which:

FIG. 1 diagrammatically shows a preferred embodiment of the device according to the invention, in the position in which it effects the displacement;

FIG. 2 shows the invention in the position in which the slide is being retracted; and FIG. 3 is a perspective view of part of the device.

As shown in the drawing (FIG. 1) a rotatable bar 1, supported by rollers 2, also rotatable, and having a substantially circular cross-section, has over its whole length a groove 3, which houses a slide 4 of substantially corresponding form and size, a substantial clearance between the parts 3 and 4 facilitating the longitudinal displacement of the slide relative to the bar.

It will be appreciated that the groove is open upwards and through it the slide reaches the outside still remaining inscribed in the cylinder defining bar 1.

According to the direction in which groove 3 opens, a body 5, for instance a billet, rests on the upper generatrix of slide 4 (FIG. 1) or of bar 1 (FIG. 2). In the first case, by causing slides 4, 4 A to slide longitudinally, billet 5 is conveyed transversely to its axis. This is the aim of the invention and is obtained without raising or lowering billet 5, therefore with a minimum work.

Once the desired displacement is accomplished, bar 1 (and the similar bar 1 A) are slightly rotated and the contact between billet 5 and bar 1 (or 1 A) occurs along the upper bar generatrix, again without need to raise or lower billet 5; slide 4, no longer retained by the contact with the billet, can move back to its starting position by sliding in groove 3.

FIG. 3 shows by way of example the means, such as a lever 6 connected to a jack, not shown, for reciprocating bar 1, and the means, for instance another jack, for axially displacing slide 4.

The operation of bar 1 is synchronized with that of bar 1 A; the same holds for the operation of slide 4 relative to that of slide 4 A.

It is self evident that changes and modifications can be carried out into the practice without departing from the scope of the invention.

What I claim is:

1. A device for displacing elongated bodies transversely to their axes comprising at least two supporting bars, of circular cross-section, the axes of which are horizontal, parallel and at the same level, said bars being mounted on means facilitating their rotation about their axes and each having a prismatic groove, open outwards in correspondence of the cylindrical bar surface, said groove housing a slide, having a transverse cross-section corresponding to that of said groove and having a part inscribed in the circumference forming the bar section; means being provided for slightly rotating each said bar and the slide contained therein about the axis thereof, in either direction, and for longitudinally displacing said slide relative to said respective bar.

2. A device according to claim 1, characterized in that the means facilitating the rotation of each bar about its axis comprise supporting rollers, and the means for slightly rotating said bar comprise radial appendages integral with the bar.

3. A device according to claim 1, characterized in that said bars are connected to one another so that their rotations are simultaneous.

4. A device according to claim 1, characterized in that the means controlling the displacement of each slide are connected to one another so that their actions are simultaneous.

5. A device according to claim 1, characterized in that means are provided for facilitating the slide movements.

6. A device according to claim 5, characterized in that the slide is provided with wheels.

* * * * *